United States Patent
Aida et al.

(10) Patent No.: US 10,005,888 B2
(45) Date of Patent: Jun. 26, 2018

(54) FLUORORUBBER MOLDED ARTICLE

(71) Applicant: Asahi Glass Company, Limited, Chiyoda-ku (JP)

(72) Inventors: Shigeru Aida, Chiyoda-ku (JP); Takeshi Yamada, Chiyoda-ku (JP); Keisuke Yagi, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

(21) Appl. No.: 15/259,345

(22) Filed: Sep. 8, 2016

(65) Prior Publication Data

US 2016/0376411 A1    Dec. 29, 2016

Related U.S. Application Data

(63) Continuation of application No. PCT/JP2015/058572, filed on Mar. 20, 2015.

(30) Foreign Application Priority Data

Mar. 25, 2014 (JP) ................................. 2014-061922

(51) Int. Cl.
| | |
|---|---|
| *C08J 5/00* | (2006.01) |
| *C08K 5/14* | (2006.01) |
| *C08K 5/3492* | (2006.01) |
| *C09K 3/10* | (2006.01) |
| *C08L 27/18* | (2006.01) |
| *F16J 15/02* | (2006.01) |

(52) U.S. Cl.
CPC .................. *C08J 5/00* (2013.01); *C08K 5/14* (2013.01); *C08K 5/3492* (2013.01); *C08L 27/18* (2013.01); *C09K 3/10* (2013.01); *C09K 3/1009* (2013.01); *F16J 15/022* (2013.01); *C08J 2327/18* (2013.01); *C08L 2201/52* (2013.01); *C08L 2205/025* (2013.01); *C08L 2205/06* (2013.01); *C08L 2312/00* (2013.01)

(58) Field of Classification Search
CPC ............. C08L 27/18; C08L 2205/025; C08L 2312/00; C08L 2205/06; C08L 2201/52; C08K 5/14; C08K 3/1009; C08K 5/3492; C08K 3/10; C08J 5/00; C08J 15/022; C08J 2327/18
See application file for complete search history.

(56) References Cited

U.S. PATENT DOCUMENTS

| | | | |
|---|---|---|---|
| 2009/0203846 A1* | 8/2009 | Park et al. | ................. C08J 3/28 525/198 |
| 2010/0151254 A1* | 6/2010 | Luo et al. | ............... F16J 15/102 428/422 |
| 2012/0202950 A1 | 8/2012 | Honda et al. | |
| 2013/0109790 A1* | 5/2013 | Fukushi et al. | ...... C09D 127/12 524/84 |

FOREIGN PATENT DOCUMENTS

| | | |
|---|---|---|
| EP | 1 499 652 A2 | 1/2005 |
| EP | 1 591 469 A1 | 11/2005 |
| WO | WO 01/98405 A2 | 12/2001 |
| WO | WO 01/98405 A3 | 12/2001 |
| WO | WO 2007/119834 A1 | 10/2007 |
| WO | WO 2011/040576 A1 | 4/2011 |
| WO | WO 2012/073977 A1 | 6/2012 |
| WO | WO 2014/084082 A1 | 6/2014 |

OTHER PUBLICATIONS

International Search Report dated Apr. 28, 2015 in PCT/JP2015/058572 filed on Mar. 20, 2015.
Takaomi Satokawa, "Fluororesin Handbook", published by Nikkan Kogyo Shimbun, first print of first edition, 1990, 10 pgs.

* cited by examiner

*Primary Examiner* — Nathan M Nutter
(74) *Attorney, Agent, or Firm* — Oblon, McClelland, Maier & Neustadt, L.L.P.

(57) ABSTRACT

To provide a fluororubber molded article which is inexpensive and excellent in fuel barrier properties against an alcohol-containing fuel. A fluororubber molded article obtained by molding and crosslinking a cross-linkable composition comprising a fluoroelastomer (A) and a fluoroelastomer (B), wherein the fluoroelastomer (A) is a copolymer comprising tetrafluoroethylene units and perfluorovinyl ether units represented by $CF_2=CF-O-R^f$ ($R^f$ is a $C_{1-20}$ perfluoroalkyl group or a $C_{2-20}$ perfluoroalkyl group having an etheric oxygen atom between carbon atoms), the fluoroelastomer (B) is a copolymer comprising tetrafluoroethylene units, propylene units and vinylidene fluoride units, and the mass ratio of (A)/(B) is from 99/1 to 30/70.

14 Claims, 1 Drawing Sheet

FLUORORUBBER MOLDED ARTICLE

TECHNICAL FIELD

The present invention relates to a fluororubber molded article excellent in fuel barrier properties.

BACKGROUND ART

Fluororubbers are excellent in fuel barrier properties, slidability, heat resistance, chemical resistance, weather resistance, electric insulation properties, etc. and are used in a wide range of fields including automobiles, industrial machines, OA equipments, electric and electronic equipments, etc.

In the automobile industry, as environmental regulations in recent years, SHED (Sealed Housing for Evaporative Determination) regulations have been strengthened, which prescribe rules on the fuel evaporation gas amount that is released from cars using gasoline as fuel.

As a fuel for automobiles, gasoline, LPG, light oil or an alcohol-containing fuel may, for example, be mentioned. An alcohol-containing fuel is a fuel obtained by mixing gasoline and an alcohol, and since it contains oxygen, it has environmental improvement potentials (characteristics as a low-pollution fuel) such that emission of carbon monoxide or soot (black smoke) is low, emission of SOx or NOx is low, and photochemical reactivity is low. Therefore, it is expected to use an alcohol-containing fuel as the fuel for automobiles, and development of a rubber material having barrier properties against an alcohol-containing fuel is desired.

A tetrafluoroethylene/perfluoro(alkyl vinyl ether)-type elastomer is called a perfluoroelastomer (hereinafter referred to also as FFKM), and its cross-linked cured product is known to be excellent in chemical resistance.

Non-Patent Document 1 discloses that a cross-linked cured product of FFKM shows little volume increase (swelling) by the immersion test and thus has good resistance against each of gasoline and methanol (Non-Patent Document 1, page 630, Table III. 3.4). Therefore, the cross-linked cured product of FFKM is considered to have barrier properties against an alcohol-containing fuel.

However, FFKM has a disadvantage that it is expensive, and while it has excellent characteristics, its applications are rather limited at present.

Patent Document 1 discloses that when FFKM and a tetrafluoroethylene (hereinafter referred to also as TFE)/propylene (hereinafter referred to also as P) elastomer are used as a mixed, heat resistance is improved as compared with the case of using FFKM alone. As examples of the TFE/P elastomer, in addition to the binary elastomer of TFE/P, 7 types of ternary elastomer are mentioned. As one example of the ternary elastomer, an elastomer of TFE/P/vinylidene fluoride (hereinafter referred to also as VdF) in a molar ratio of 40-60/60-40/1-10 is disclosed.

PRIOR ART DOCUMENTS

Patent Document

Patent Document 1: WO 2007/119834

Non-Patent Document

Non-Patent Document 1: Edited by Takaomi Satokawa, "Fluororesin Handbook", published by Nikkan Kogyo Shimbun, first print of first edition on Nov. 30, 1990, pp. 611-621, pp. 629-631

DISCLOSURE OF INVENTION

Technical Problem

However, in Table III. 2.5 at page 621 in Non-Patent Document 1, it is disclosed that AFLAS #150 (trade name, manufactured by Asahi Glass Company, Limited) as a binary elastomer of TFE/P tends to swell in gasoline, although it scarcely swell in the immersion test in methanol. Further, it is disclosed that AFLAS #200 (trade name, manufactured by Asahi Glass Company, Limited) as a ternary elastomer of TFE/P/VdF swells in methanol, and it also swells in gasoline.

Further, it is shown that in a mixture of gasoline and methanol, each of the binary elastomer and the ternary elastomer tends to easily swell to the same extent.

Also in Patent Document 1, no study is made with respect to fuel barrier properties.

That is, a fluororubber molded product which is inexpensive as compared with FFKM and which is excellent in fuel barrier properties against an alcohol-containing fuel has not been known.

The present invention has been made in view of the above circumstances, and it is an object of the present invention to provide a fluororubber molded article which is more inexpensive than conventional FFKM and which is excellent in fuel barrier properties against an alcohol-containing fuel.

Solution to Problem

The present invention provides a fluororubber molded article having the following constructions [1] to [15].

[1] A fluororubber molded article obtained by molding and crosslinking a crosslinkable composition comprising the following fluoroelastomer (A) and the following fluoroelastomer (B), wherein the mass ratio (A)/(B) of the following fluoroelastomer (A) to the following fluoroelastomer (B) in the crosslinkable composition is from 99/1 to 30/70, Fluoroelastomer (A): a copolymer comprising units based on tetrafluoroethylene and units based on a perfluorovinyl ether represented by the following formula (i):

$$CF_2=CF-O-R^f \qquad (i)$$

wherein $R^f$ is a $C_{1-20}$ perfluoroalkyl group or a $C_{2-20}$ perfluoroalkyl group having an etheric oxygen atom between carbon atoms, Fluoroelastomer (B): a copolymer comprising units based on tetrafluoroethylene, units based on propylene and units based on vinylidene fluoride.

[2] The fluororubber molded article according to [1], wherein in the fluoroelastomer (B), the molar ratio of [the sum of units based on tetrafluoroethylene and units based on propylene]/[units based on vinylidene fluoride] is from

[3] The fluororubber molded article according to [1] or [2], wherein the content of hydrogen atoms in the fluoroelastomer (A) is at most 0.1 mass %.

[4] The fluororubber molded article according to any one of [1] to [3], wherein the perfluorovinyl ether represented by the formula (i) is a perfluoroalkyl vinyl ether wherein the number of carbon atoms in $R^f$ is from 1 to 8.

[5] The fluororubber molded article according to any one of [1] to [4], wherein in the fluoroelastomer (A), the molar ratio of [units based on tetrafluoroethylene]/[units based on the perfluorovinyl ether] is from 30/70 to 80/20.

90/10 to 50/50, and the molar ratio of [units based on tetrafluoroethylene]/[units based on propylene] is from 40/60 to 70/30.

[6] The fluororubber molded article according to any one of [1] to [5], wherein the fluoroelastomer (A) has a cross-linking site.

[7] The fluororubber molded article according to [6], wherein the cross-linking site is an iodine atom or a bromine atom.

[8] The fluororubber molded article according to any one of [1] to [7], wherein the mass ratio (A)/(B) in the cross-linkable composition is from 95/5 to 30/70.

[9] The fluororubber molded article according to any one of [1] to [8], wherein the crosslinkable composition further contains an organic peroxide.

[10] The fluororubber molded article according to [9], wherein the content of the organic peroxide is from 0.05 to 10 parts by mass per 100 parts by mass of the total amount of the fluoroelastomer (A) and the fluoroelastomer (B).

[11] The fluororubber molded article according to any one of [1] to [10], wherein the crosslinkable composition further contains a crosslinking aid.

[12] The fluororubber molded article according to [11], wherein the content of the crosslinking aid is from 0.1 to 10 parts by mass per 100 parts by mass of the total amount of the fluoroelastomer (A) and the fluoroelastomer (B).

[13] The fluororubber molded article according to any one of [1] to [12], wherein the fluorine content in the crosslinkable composition is from 60 to 73 mass %, based on the entire polymer mass.

[14] The fluororubber molded article according to any one of [1] to [13], wherein in the fluororubber, the fluoroelastomer (A) and the fluoroelastomer (B) are distributed to exhibit a gyroid structure.

[15] The fluororubber molded article according to any one of [1] to [14], wherein the fluororubber molded article is an automobile fuel seal member.

Advantageous Effects of Invention

According to the present invention, it is possible to obtain a fluororubber molded article which is inexpensive and which is excellent in fuel barrier properties.

DESCRIPTION OF EMBODIMENTS

Figure 1:
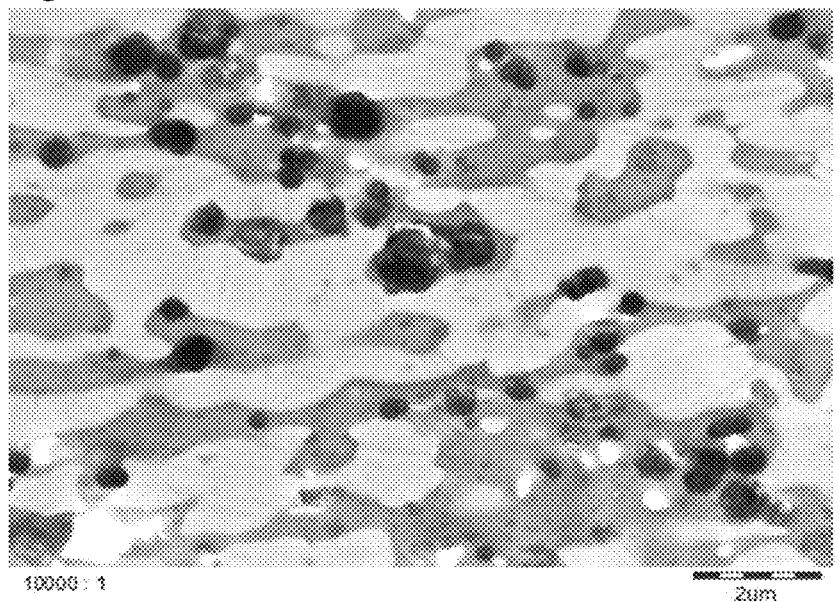
FIG. 1 is a view showing a transmission electron microscopic photograph of the fluororubber molded article prepared in Ex. 1.

In this specification, hereinafter, units based on a monomer may be represented by attaching the monomer name to "units". For example, units based on tetrafluoroethylene may be referred to also as "tetrafluoroethylene units" or "TFE units", and units based on a monomer (a1) may be referred to also as "monomer (a1) units".

Further, an alkyl group having an etheric oxygen atom between carbon atoms may be referred to also as an "oxaalkyl group". An oxaalkyl group is meant for an alkyl group wherein at least one carbon atom in the alkyl group excluding the terminal carbon atoms is substituted by an oxygen atom, and in a case where two or more carbon atoms are substituted by oxygen atoms, such oxygen atoms shall not be adjacent to one another. Likewise, an alkylene group having an etheric oxygen atom between carbon atoms may be referred to also as an "oxaalkylene group". However, in this specification, the number of carbon atoms in an oxaalkyl group or an oxaalkylene group, shall not include carbon atoms substituted by oxygen atoms.

A "polyfluorooxaalkyl group" and a "polyfluorooxaalkylene group" are, respectively, meant for an oxaalkyl group and an oxaalkylene group wherein two or more hydrogen atoms bonded to carbon atoms are substituted by fluorine atoms. Further, a "perfluorooxaalkyl group" and a "perfluorooxaalkylene group" are, respectively, meant for an oxaalkyl group and an oxaalkylene group wherein all of hydrogen atoms bonded to carbon atoms are substituted by fluorine atoms.

<Fluoroelastomer (A)>

The fluoroelastomer (A) in the present invention comprises units based on tetrafluoroethylene and units based on a perfluorovinyl ether (hereinafter referred to as PAVE) represented by $CF_2=CF-O-R^f$ (wherein $R^f$ is a $C_{1-20}$ perfluoroalkyl group or a $C_{2-20}$ perfluorooxaalkyl group).

$R^f$ in $CF_2=CF-O-R^f$ may be linear, branched or cyclic, and is preferably linear or branched. $R^f$ is preferably a $C_{1-8}$ perfluoroalkyl group or a $C_{2-8}$ perfluorooxaalkyl group.

Specific examples of PAVE include $CF_2=CF-O-CF_3$, $CF_2=CF-O-CF_2CF_3$, $CF_2=CF-O-CF_2CF_2CF_3$, $CF_2=CF-O-CF_2CF(CF_3)OCF_2CF_2CF_3$, $CF_2=CF-O-CF_2CF_2-O-CF_2CF_3$, $CF_2=CF-O-CFCFCF_3-O-CF_2CF_2CF_3$, etc. Among them, $CF_2=CF-O-CF_3$ is preferred.

As PAVE, one type may be used alone, or two or more types may be used in combination.

The molar ratio of TFE units/PAVE units in the fluoroelastomer (A) is preferably from 30/70 to 80/20, more preferably from 40/60 to 75/25, most preferably from 60/40 to 75/25. Within such a range, the fluoroelastomer (A) will be excellent in properties as a rubber, such as flexibility, elongation, strength, etc.

When the content of TFE units is at most the upper limit in the above range, crystallinity of the fluoroelastomer (A) will not be too high, and good flexibility can easily be obtained. On the other hand, when the content of TFE units is at least the lower limit in the above range, good mechanical strength tends to be readily obtained. Further, when the content of PAVE units is at most the upper limit in the above range, such is preferred from the viewpoint of economical efficiency.

The fluoroelastomer (A) may contain one or more other types of units based on copolymerizable monomer (hereinafter referred to as monomer (a1) other than TFE and PAVE.

The monomer (a1) may, for example, be a perfluoroalkene represented by the formula $CF_2=CF-R^{f1}$ (wherein $R^{f1}$ is a $C_{1-20}$ perfluoroalkyl group or a $C_{2-20}$ perfluorooxaalkyl group).

$R^{f1}$ may be linear, branched or cyclic, and is preferably linear or branched.

The number of carbon atoms in the perfluoroalkyl group as $R^{f1}$ is preferably from 1 to 20, more preferably from 1 to 10, most preferably from 1 to 5.

The number of carbon atoms in the perfluorooxaalkyl group as $R^{f1}$ is preferably from 2 to 20, more preferably from 2 to 10, most preferably from 2 to 5.

The perfluorooxaalkyl group as $R^{f1}$ may, for example, be a group represented by the formula —$(CF_2CFXO)_y R^{f2}$ (wherein X is F or $CF_3$, y is an integer of from 1 to 5, and $R^{f2}$ is a $C_{1-3}$ perfluoroalkyl group).

In a case where the fluoroelastomer (A) contains monomer (a1) units, the content thereof is preferably from 0.01 to 50 mol %, more preferably from 0.1 to 30 mol %, particularly preferably from 0.5 to 20 mol %, to the total content of TFE units and PAVE units. Within such a range, good fuel barrier properties tend to be readily obtained.

The fluoroelastomer (A) is more preferably one containing no monomer (a1) units. As the fluoroelastomer (A), FFKM is preferred.

The fluoroelastomer (A) is one to be used in the production of a fluororubber molded article via a crosslinking step, and thus is preferably one having a crosslinking site. When it has a crosslinking site, the crosslinking reaction tends to be facilitated.

As such a crosslinking site, one known as a crosslinking site in FFKM may be employed.

Examples of the crosslinking site may be a bromine atom, an iodine atom, a cyano group, etc. A method for introducing such crosslinking site(s) to the fluoroelastomer (A) may, for example, be a method of copolymerizing a compound having a bromine atom, an iodine atom or a cyano group, or a method of introducing an iodine atom to a polymer terminal by iodine transfer polymerization.

By the method of introducing crosslinking sites by copolymerization, it is easy to adjust the content of the crosslinking sites, and therefore, such a method is preferred when it is desired to increase the crosslinking density by increasing the content of the crosslinking sites.

On the other hand, by the method of introducing an iodine atom to a polymer terminal by iodine transfer polymerization, it is easy to control the molecular weight and molecular weight distribution of the resulting polymer, and therefore, such a method is preferred to suppress formation of an oligomer which presents adverse effects to processability or mechanical properties of the fluoroelastomer (A).

Iodine atoms and/or bromine atoms in the fluoroelastomer (A) derive from a chain transfer agent containing an iodine atom and/or a bromine atom, or from a monomer containing an iodine atom and/or a bromine atom.

The monomer containing an iodine atom and/or a bromine atom may, for example, be $CF_2$=CFBr, $CH_2$=$CHCF_2CF_2Br$, $CF_2$=CF—O—$CF_2CF_2$—I, $CF_2$=CF—O—$CF_2CF_2$—Br, $CF_2$=CF—O—$CF_2CF_2CH_2$—I, $CF_2$=CF—O—$CF_2CF_2CH_2$—Br, $CF_2$=CF—O—$CF_2CF_2(CF_3)$—O—$CF_2CF_2CH_2$—I, $CF_2$=CF—O—$CF_2CF_2(CF_3)$—O—$CF_2CF_2CH_2$—Br, etc.

The chain transfer agent containing an iodine atom and/or a bromine atom may, for example, be a compound represented by I—$R^{f3}$—I (wherein $R^{f3}$ is a $C_{1-8}$ perfluoroalkylene group or a $C_{2-8}$ perfluorooxaalkylene group), a compound represented by I—$R^{f4}$—Br (wherein $R^{f4}$ is a $C_{1-8}$ perfluoroalkylene group or a $C_{2-8}$ perfluorooxaalkylene group), a compound represented by I—$R^1$—I (wherein $R^1$ is a $C_{1-8}$ alkylene group or a $C_{2-8}$ oxaalkylene group), etc.

Specific examples of I—$R^{f3}$—I include diiododifluoromethane, 1,2-diiodoperfluoroethane, 1,3-diiodoperfluoropropane, 1,4-diiodoperfluorobutane, 1,5-diiodoperfluoropentane, 1,6-diiodoperfluorohexane, 1,7-diiodoperfluoroheptane, 1,8-diiodoperfluorooctane, etc. Among them, 1,4-diiodoperfluorobutane, or 1,6-diiodoperfluorohexane is preferred, and 1,4-diiodoperfluorobutane is more preferred. Specific examples of I—$R^{f4}$—Br include 1-iodo-4-bromoperfluorobutane, 1-iodo-6-bromoperfluorohexane, 1-iodo-8-bromoperfluorooctane, etc. Among them, 1-iodo-4-bromoperfluorobutane or 1-iodo-6-bromoperfluorohexane is preferred, and 1-iodo-4-bromoperfluorobutane is more preferred.

Specific examples of I—$R^1$—I include 1,2-diiodoethane, 1,4-diiodobutane, diiodopentane, 1,6-diiodohexane, etc.

The total content of iodine and bromine atoms in the fluoroelastomer (A) is preferably from 0.1 to 1.5 mass %, more preferably from 0.1 to 1.0 mass %, most preferably from 0.1 to 0.5 mass %. Within such a range, good fuel barrier properties can be easily obtained in the fluororubber molded article. Further, good rubber physical properties can be easily obtained in the fluororubber molded article.

As the fluoroelastomer (A), one containing substantially no hydrogen atom is preferred. The content of hydrogen atoms in the fluoroelastomer (A) is preferably at most 0.1 mass %, more preferably at most 0.07 mass %, most preferably at most 0.05 mass %. When the content of hydrogen atoms is within the above range, good fuel barrier properties tend to be readily obtained. Further, good heat resistance or chemical resistance tends to be readily obtained.

Hydrogen atoms in the fluoroelastomer (A) derive from a polymerization initiator, a chain transfer agent, or a monomer containing hydrogen atoms, to be used during the production.

The monomer containing hydrogen atoms may, for example, be $CF_2$=CR—O—$CH_2CF_3$, $CF_2$=CF—O—$CH_2CF_2CF_2CF_3$, $CF_2$=CF—O—$CH_2(CF_2CF_2)_2H$, $CF_2$=CR—O—$CF_2CF_2CH_2$—I, $CF_2$=CF—O—$CF_2CF_2CH_2$—Br, $CF_2$=CF—O—$CF_2CF_2(CF_3)$—O—$CF_2CF_2CH_2$—I, $CF_2$=CF—O—$CF_2CF_2(CF_3)$—O—$CF_2CF_2CH_2$—Br, etc.

The Mooney viscosity ($ML_{1+4}$, 121° C.) of the fluoroelastomer (A) in accordance with JIS K6300, is preferably from 1 to 100, more preferably from 5 to 90, further preferably from 5 to 80, particularly preferably from 5 to 70. $ML_{1+4}$, 121° C. is a Mooney viscosity after preheating for 1 minute and heating for 4 minutes at a temperature of 121° C. by means of an L-type rotor (the same applies hereinafter).

The Mooney viscosity is an index for the molecular weight of a rubber, and the larger the value, the higher the molecular weight, and the smaller the value, the lower the molecular weight. If the Mooney viscosity is too high, the blending operation tends to be difficult, and if it is too low, the releasability tends to be deteriorated, and the thermal stability tends to be low. Within the above range, the blending operation will be facilitated, and good rubber physical properties tend to be readily obtained in the fluororubber molded article.

The glass transition temperature (hereinafter referred to as Tg) of the fluoroelastomer (A) is preferably at most 10° C., more preferably from −50 to 8° C., further preferably from −40 to 5° C., most preferably from −30 to 3° C. Within such a range, the fluororubber molded article will be excellent in sealing properties at a low temperature.

As the fluoroelastomer (A), one type may be used alone, or two or more types may be used in combination.

(Method for Producing Fluoroelastomer (A))

The method for producing the fluoroelastomer (A) is not particularly limited and may be a known method, such as an emulsion polymerization method or a solution polymerization method. In particular, an emulsion polymerization method is preferred, since it is excellent in adjustment of the molecular weight and copolymer composition, and in productivity.

In the emulsion polymerization method, a monomer mixture comprising TFE and PAVE is subjected to radical copolymerization in the presence of an aqueous medium, a radical polymerization initiator, an emulsifier and a chain transfer agent.

As the emulsifier, a known one may be suitably used. For example, a hydrocarbon-type emulsifier such as sodium lauryl sulfate or sodium dodecylbenzene sulfonate, a fluorinated emulsifier such as ammonium perfluorooctanoate, ammonium perfluorohexane acid, $C_2F_5$—O—$C_2F_4$—O—$CF_2$—COONH$_4$, $C_3F_7$—O—CF(CF$_3$)—$CF_2$—O—CF(CF$_3$)—COONH$_4$, etc. may be mentioned. In particular, a fluorinated emulsifier is preferred from the viewpoint of the stability during polymerization.

As the chain transfer agent, in addition to the above-mentioned chain transfer agent containing an iodine atom and/or a bromine atom, a chain or cyclic saturated hydrocarbon such as methane, ethane, propane, butane, pentane, hexane or cyclohexane, an alcohol such as methanol, ethanol or propanol, a mercaptan such as tert-dodecyl mercaptan, n-dodecyl mercaptan or n-octadecyl mercaptan, etc. may be mentioned. As the chain transfer agent, one type may be used alone, or two or more types may be used in combination.

As the aqueous medium, water or a mixed solvent of water and a water-soluble organic solvent, is preferred.

The water-soluble organic solvent may, for example, be tert-butanol, propylene glycol, dipropylene glycol, dipropylene glycol monomethyl ether, tripropylene glycol, etc. In particular, tert-butanol or dipropylene glycol monomethyl ether is preferred.

In the mixed solvent, the proportion of the water-soluble organic solvent is preferably from 1 to 40 parts by mass, more preferably from 3 to 30 parts by mass, per 100 parts by mass of water.

As the radical polymerization initiator, a known radical polymerization initiator commonly used in the preparation of perfluoroelastomers, may be suitably used. It may be appropriately selected for use depending on the polymerization method. For example, when the reaction is to be carried out in an aqueous medium such as water, a water-soluble radical polymerization initiator is preferably used.

Specific examples of the water-soluble radical polymerization initiator include a persulfate such as ammonium persulfate, an organic initiator such as hydrogen peroxide, disuccinic acid peroxide or azobisisobutylamidine dihydrochloride, etc.

Further, a redox initiator consisting of a combination of a persulfate or hydrogen peroxide, and a reducing agent such as sodium bisulfite or sodium thiosulfate, or an inorganic initiator having a small amount of iron, a ferrous salt or silver sulfate added to the redox initiator, may also be used.

<Fluoroelastomer (B)>

The fluoroelastomer (B) in the present invention comprises TFE units, P units and VdF units.

In the fluoroelastomer (B), the molar ratio of [the sum of TFE units and P units]/VdF units is preferably from 90/10 to 50/50, more preferably from 85/15 to 55/45, further preferably from 80/20 to 60/40, particularly preferably from 80/20 to 70/30.

Further, the molar ratio of TFE units/P units is preferably from 40/60 to 70/30, more preferably from 50/50 to 65/35, most preferably from 51/49 to 58/42.

Within the above range, excellent fuel barrier properties and good rubber physical properties can be easily obtained in the fluororubber molded article.

The fluoroelastomer (B) may contain at least one type of units based on a copolymerizable monomer (hereinafter referred to as monomer (b1)) other than TFE units, P units and VdF units.

The monomer (b1) may, for example, be said PAVE, a compound represented by $CH_2$=CH—$R^{f5}$ (wherein $R^{f5}$ is a $C_{1-20}$ polyfluoroalkyl group or a $C_{2-20}$ polyfluorooxaalkyl group), a compound represented by $CR^4R^5$=$CR^6$COOCH=$CH_2$ (wherein $R^4$ and $R^5$ are each independently a hydrogen atom, a $C_{1-10}$ alkyl group or a $C_{2-10}$ oxaalkyl group, and $R^6$ is a hydrogen atom, a fluorine atom or a methyl group), and partially fluorinated vinyl ethers ($CF_2$=CF—O—$CH_2CF_3$, $CF_2$=CF—O—$CH_2CF_2CF_2CF_3$, $CF_2$=CF—O—$CH_2(CF_2CF_2)_2H$, etc.), etc.

In a case where the fluoroelastomer (B) contains monomer (b1) units, the content thereof is preferably from 0.01 to 20 mol %, more preferably from 0.1 to 15 mol %, particularly preferably from 1 to 10 mol %, to the total content of TFE units, P units and VdF units. Within such a range, good fuel barrier properties and good rubber physical properties can be easily obtained in the fluororubber molded article.

The fluoroelastomer (B) is one to be used in the production of the fluororubber molded article via a crosslinking step, and preferably has a crosslinking site. When it has a crosslinking site, the crosslinking reaction tends to be facilitated.

Examples of the crosslinking site in the fluoroelastomer (B) may be a bromine atom, an iodine atom, a cyano group, etc.

As the method for introducing a crosslinking site, a known method may be used. For example, in a case where the crosslinking site is a double bond, it is possible to use a method of contacting the fluoroelastomer (B) with an alkali to carry out HF elimination to form an intramolecular double bond.

The content of crosslinking sites is preferably from 0.01 to 5 mol %, more preferably from 0.05 to 3 mol %, particularly preferably from 0.1 to 2 mol %, based on the sum of units constituting the fluoroelastomer (B). Within such a range, good fuel barrier properties can be easily obtained in the fluororubber molded article. Further, good rubber physical properties can be easily obtained in the fluororubber molded article.

The content of crosslinking sites can be measured by spectroscopic techniques such as infrared absorption spectroscopy, nuclear magnetic resonance or a X-ray fluorescence elemental analysis.

The Mooney viscosity ($ML_{1+4}$, 121° C.) of the fluoroelastomer (B) in accordance with JIS K6300, is preferably from 1 to 200, more preferably from 5 to 190, particularly preferably from 10 to 180. Within the above range, the blending operation will be facilitated, and good rubber physical properties can be easily obtained in the fluororubber molded article.

Tg of the fluoroelastomer (B) is preferably at most 10° C., more preferably from −50 to 8° C., further preferably from −40 to 5° C., most preferably from −30 to 3° C. Within such a range, the fluororubber molded article will be excellent in sealing properties at a low temperature.

(Method for Producing Fluoroelastomer (B))

In the present invention, a method for polymerizing a monomer in the production method of the fluoroelastomer (B) is not particularly limited, and it is possible to use a known polymerization method such as emulsion polymerization or solution polymerization. In particular, an emulsion polymerization method is preferred, since it is excellent in adjustment of the molecular weight and copolymer composition, and in productivity.

In the emulsion polymerization method, a monomer mixture comprising TFE, P and VdF is subjected to radical copolymerization in the presence of an aqueous medium, a radical polymerization initiator, an emulsifier and a chain transfer agent.

The same ones as an emulsifier, an aqueous medium, a radical polymerization initiator and a chain transfer agent which can be used in the method for producing the fluoroelastomer (A), may be used.

After completion of the polymerization reaction of monomers, a step of introducing crosslinking sites may be carried out, as the case requires.

<Crosslinkable Composition>

The crosslinkable composition (hereinafter referred to also as composition (X)) is a composition comprising a fluoroelastomer (A) and a fluoroelastomer (B).

The mass ratio (A)/(B) of the fluoroelastomer (A) to the fluoroelastomer (B) is from 99/1 to 30/70, preferably from 90/10 to 40/60, more preferably 80/20 to 50/50, particularly preferably from 75/25 to 60/40.

When the mass ratio in content of the fluoroelastomer (A) to the fluoroelastomer (B) is within the above range, good fuel barrier properties and good rubber physical properties can be easily obtained in the fluororubber molded article.

The fluorine content in the composition (X) is preferably from 60 to 73 mass %, more preferably from 65 to 72 mass %, particularly preferably from 67 to 70 mass %, to the entire polymer mass. When the fluorine content is at most the upper limit value in the above range, the cost will not be too high, and good mechanical strength tends to be readily obtainable, and when it is at least the lower limit value, good fuel barrier properties, good chemical resistance and good heat resistance can easily be obtained.

(Organic Peroxide)

The composition (X) preferably contains an organic peroxide. The organic peroxide is not particularly limited, but preferred is one, of which one-minute half-life temperature being a temperature at which a half in amount of the organic peroxide decomposes in one minute, is preferably from 100 to 250° C., more preferably from 150 to 200° C.

Specific examples of the organic peroxide include dialkyl peroxides such as di-tert-butyl peroxide, tert-butyl cumyl peroxide, dicumyl peroxide, 1,4-bis[(t-butylperoxy) isopropyl]benzene, 2,5-dimethyl-2,5-di(tert-butylperoxy)hexane, 2,5-dimethyl-2,5-di (tert-butylperoxy)hexane-3,1,3-bis(tert-butylperoxyisopropyl)benzene, etc., 1,1-di(tert-butylperoxy)-3,3,5-trimethylcyclohexane, 2,5-dimethylhexane-2,5-dihydroxyperoxide, benzoyl peroxide, tert-butyl peroxybenzene, 2,5-dimethyl-2,5-di(benzoyl peroxy) hexane, tert-butylperoxy maleic acid, tert-butyl peroxyisopropyl carbonate, etc. As the organic peroxide, one type may be used alone, or two or more types may be used in combination.

The content of the organic peroxide in the composition (X) is preferably from 0.05 to 10 parts by mass, more preferably from 0.2 to 5 parts by mass, particularly preferably from 0.5 to 3 parts by mass, per 100 parts by mass of the total amount of the fluoroelastomer (A) and the fluoroelastomer (B). Within the above range, good fuel barrier properties and good rubber physical properties can be easily obtained in the fluororubber molded article.

(Crosslinking Aid)

The composition (X) preferably contains at least one type of crosslinking aid. When it contains a crosslinking aid, the composition (X) will be excellent in crosslinking properties.

Specific examples of the crosslinking aid include triallyl cyanurate (hereinafter referred to as TAC), triallyl isocyanurate (hereinafter referred to as TAIC), trimethallyl isocyanurate (hereinafter referred to as TMAC), 1,3,5-triacryloylhexahydro-1,3,5-triazine, triallyl trimellitate, m-phenylenediamine bismaleimide, p-quinone dioxime, p,p'-dibenzoyl quinone dioxime, dipropargyl terephthalate, diallyl phthalate, N,N',N'',N'''-tetraallyl terephthalamide, vinyl group-containing siloxane oligomers such as polymethyl vinyl siloxane, polymethyl phenyl vinyl siloxane, etc.

In particular, TAC, TAIC or TMAC is preferred, and TAIC is more preferred.

The content of the crosslinking aid in the composition (X) is preferably from 0.1 to 10 parts by mass, more preferably from 0.5 to 5 parts by mass, per 100 parts by mass of the total amount of the fluoroelastomer (A) and the fluoroelastomer (B). Within the above range, excellent fuel barrier properties can be easily obtained in the fluororubber molded article. Further, good balance can be easily obtained between the tensile strength and the elongation in the fluororubber molded article.

(Scorch Retarder)

The composition (X) may contain at least one type of scorch retarder. As the scorch retarder, phenolic hydroxyl group-containing compounds such as bisphenol A, bisphenol AF, phenol, cresol, p-phenylphenol, m-phenylphenol, o-phenylphenol, allyl phenol, p-hydroxybenzoic acid, ethyl p-hydroxybenzoate, etc., quinones such as hydroquinone, hydroquinone monoethyl ether, hydroquinone monomethyl ether, etc., α-methylstyrene dimers such as 2,4-di(3-isopropylphenyl)-4-methyl-1-pentene, 2,4-di(4-isopropylphenyl)-4-methyl-1-pentene, 2-(3-isopropylphenyl)-4-(4-isopropylphenyl)-4-methyl-1-pentene, 2-(4-isopropylphenyl)-4-(3-isopropylphenyl)-4-methyl-1-pentene, 2,4-di(3-methylphenyl)-4-methyl-1-pentene, 2,4-di(4-methylphenyl)-4-methyl-1-pentene, 2,4-diphenyl-4-methyl-1-pentene, etc. may be exemplified.

Among them, phenolic hydroxyl-containing compounds or α-methylstyrene dimers are preferred; o-phenylphenol or 2,4-diphenyl-4-methyl-1-pentene is more preferred; and o-phenylphenol is particularly preferred.

The content of the scorch retarder in the composition (X) is preferably from 0.05 to 3 parts by mass, more preferably from 0.05 to 1 part by mass, per 100 parts by mass of the total amount of the fluoroelastomer (A) and the fluoroelastomer (B).

(Metal Oxide)

The composition (X) of the present invention preferably contains at least one type of metal oxide. Especially when the fluoroelastomer (A) contains a bromine atom, if a metal oxide is contained, the crosslinking reaction can be rapidly and reliably proceeded.

As specific examples of the metal oxide, oxides of divalent metals, such as magnesium oxide, calcium oxide, zinc oxide, lead oxide, etc. are preferred.

The content of the metal oxide in the composition (X) is preferably from 0.1 to 10 parts by mass, more preferably from 0.5 to 5 parts by mass, per 100 parts by mass of the total amount of the fluoroelastomer (A) and the fluoroelastomer (B). Within the above range, good rubber physical properties can be easily obtained in the fluororubber molded article.
(Pigment)

The composition (X) may contain at least one type of pigment for coloring.

The pigment includes inorganic pigments and organic pigments. As the inorganic pigments, it is possible to use titanium dioxide, zinc oxide, ultramarine, red iron oxide, lithopone, lead, cadmium, iron, cobalt, aluminum, a hydrochloride, a sulfate, etc.

The organic pigments include azo pigments, copper phthalocyanine pigments, etc.

The content of the pigment in the composition (X) is preferably from 0.1 to 50 parts by mass per 100 parts by mass of the total amount of the fluoroelastomer (A) and the fluoroelastomer (B).
(Filler)

The composition (X) may contain at least one type of filler. As the filler, an inorganic filler or organic filler having various shapes, may be mentioned.

As the inorganic filler, for example, fumed silica, calcined silica, precipitated silica, ground silica, fused silica, silicic anhydride, hydrous silicic acid, diatomaceous earth, iron oxide, zinc oxide, activated zinc white, titanium oxide, barium oxide, magnesium oxide, calcium carbonate, calcium bicarbonate, surface treated fine calcium carbonate, magnesium carbonate, zinc carbonate, magnesium hydroxide, calcined clay, clay, carbon black, or their fatty acid- or fatty acid ester-treated products, etc. may be mentioned.

As the organic filler, for example, particles of a styrene resin, particles of an acrylic resin, etc. may be mentioned.

The content of the filler in the composition (X) is preferably from 1 to 100 parts by mass per 100 parts by mass of the total amount of the fluoroelastomer (A) and the fluoroelastomer (B).
(Processing Aid)

The composition (X) may contain at least one type of processing aid. As the processing aid, sodium stearate or zinc stearate may, for example, be mentioned.

The content of the processing aid in the composition (X) is preferably from 0.01 to 10 parts by mass, more preferably from 0.1 to 5 parts by mass, per 100 parts by mass of the total amount of the fluoroelastomer (A) and the fluoroelastomer (B).
(Production Method of the Composition (X))

The composition (X) is preferably produced by kneading a fluoroelastomer (A), a fluoroelastomer (B) and additives as the case requires.

The fluoroelastomer (A) and the fluoroelastomer (B) are usually kneaded in a solid state. The fluoroelastomer (A) and the fluoroelastomer (B) may be preliminarily mixed, and then additives may be added thereto, followed by kneading.

Otherwise, it is possible to adopt a method such that an aqueous dispersion of the fluoroelastomer (A) and an aqueous dispersion of the fluoroelastomer (B) are preliminarily mixed; the mixed aqueous dispersions are flocculated and isolated to obtain a mixture of the fluoroelastomer (A) and the fluoroelastomer (B); and additives may be added thereto, followed by kneading. The flocculation method of the mixed aqueous dispersions is not particularly limited, and a method of changing the pH of the aqueous dispersions, a method of mechanical agitation, or a method of salting by adding a metal salt, may be mentioned.

As the kneader, a twin roll mill, a kneader, a Banbury mixer or the like may be employed. In a case where heat generation is vigorous at the time of kneading, it is preferred to cool the kneader. The kneading temperature is preferably at most 60° C., more preferably at most 50° C. Here, the lower limit value for the kneading temperature is not particularly limited, but it is usually at least 20° C.
<Fluororubber Molded Article>

The fluororubber molded article of the present invention is obtainable by molding and crosslinking the composition (X).

The molding and crosslinking may be carried out simultaneously, or the molding may be followed by crosslinking. The molding method is not particularly limited, and various molding methods may be mentioned such as compression molding, extrusion molding, injection molding, etc.

The crosslinking temperature in the case of crosslinking with an organic peroxide is preferably from 100 to 300° C., more preferably from 150 to 250° C. Within such a range, good fuel barrier properties and good rubber physical properties can be easily obtained in the fluororubber molded article. It is also preferred to combine a primary crosslinking reaction at a relatively low temperature and a secondary crosslinking reaction at a relatively high temperature. The primary crosslinking reaction temperature is usually from 150 to 200° C. The secondary crosslinking reaction temperature is usually preferably in a range of 200 to 300° C., more preferably from 220 to 290° C., particularly preferably from 230 to 280° C. The crosslinking time may be suitably selected.

As a specific example of the combination of a primary crosslinking reaction and a secondary crosslinking reaction, it is preferred, for example, to carry out the primary crosslinking by a hot press of from 150 to 200° C. for from 3 to 60 minutes and carry out the second crosslinking in an oven of from 200 to 300° C. for from 1 to 24 hours.

Crosslinking of the composition (X) is also preferably carried out by using ionizing radiation. In this case, crosslinking proceeds even if the composition (X) contains no organic peroxide. As the ionizing radiation, electron beam, y-ray or the like may be mentioned. As a crosslinking condition, from 50 to 700 gray is preferred, and from 80 to 400 gray is more preferred. The crosslinking temperature is preferably from 0 to 300° C., more preferably from 10 to 200° C.

Figure 2:
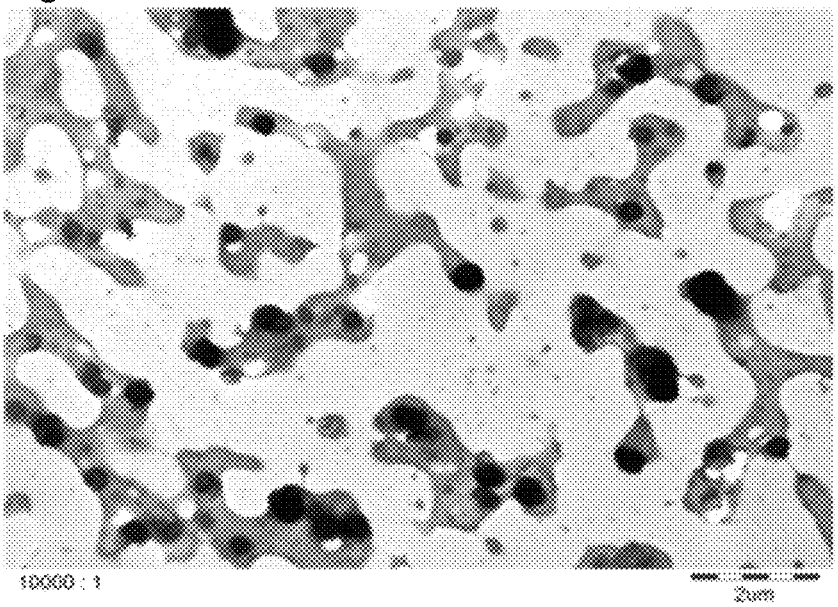
FIG. 2 is a view showing a transmission electron microscopic photograph of the fluororubber molded article prepared in Ex. 2.

By molding and crosslinking the composition (X), a fluororubber is likely to be formed wherein the fluoroelastomer (A) and the fluoroelastomer (B) are distributed to exhibit a microlayer separated structure as shown in FIGS. 1 and 2. The microlayer separated structure as shown in FIGS. 1 and 2 is called a gyroid structure which is different from a structure called a sea-island structure. Since the fluororubber in the fluororubber molded article of the present invention exhibits a gyroid structure, high fuel barrier properties are considered to be accomplished.

As the fluororubber molded article, the following molded articles may be exemplified, but it is not limited thereto.

In automobile-related fields, it is suitable as a sliding member to be used at a site at which it undergoes sliding in contact with another material. In particular, a sealing material is preferred.

As an automobile fuel sealing material, gaskets to be used in the engine and its peripheral devices (engine head gaskets, metal gaskets, oil pan gaskets, universal joint gaskets, etc.), various types of sealing material (various sealing materials for AT equipment, sealing materials for a fuel system and its peripheral equipment, etc.), may be mentioned.

As a specific example, a piston ring, an O(corner)-ring, a packing, a diaphragm, a crank shaft seal, a cam shaft seal, a valve stem seal, a manifold packing, an oxygen sensor seal, an injector O-ring, an injector packing, a fuel pump O-ring, a gear box seal, a power piston packing, a cylinder liner seal, a front pump seal of an automatic transmission, a rear axle pinion seal, a pinion seal of a speedometer, a piston cup of a foot brake, an O-ring for torque transmission, an oil seal, a seal of an exhaust gas re-combustion device, a bearing seal, a sensor diaphragm of a carburetor or the like may be mentioned.

<Alcohol-Containing Fuel>

According to the present invention, it is possible to obtain a fluororubber molded article excellent in fuel barrier properties against an alcohol-containing fuel, as shown in Examples given later.

Therefore, the fluororubber molded article of the present invention is particularly suitable as a member (e.g. an automobile fuel seal member) in contact with an alcohol-containing fuel.

The alcohol-containing fuel is a liquid fuel having an alcohol or an ether mixed to gasoline and/or naphtha. One sold as a normal automobile fuel may be used.

As a practical representative of the alcohol-containing fuel, a mixture of gasoline:ethanol=90:10 (mass ratio) or a mixture of gasoline:methanol=85:15 (mass ratio) may, for example, be mentioned.

<Advantageous Effects>

As mentioned above, Non-Patent Document 1 discloses that each of the TFE/P binary elastomer and the TFE/P/VdF ternary elastomer is likely to be swelling to the same extent in a mixture of gasoline and methanol. Based on such well known technologies, it is expected that even if the binary elastomer or the ternary elastomer being a component that swells in an alcohol-containing fuel, is mixed with FFKM, the resulting mixture will not have a barrier property to an alcohol-containing fuel.

However, as shown in Examples given below, although even if the TFE/P binary elastomer and the fluoroelastomer (A) are mixed, the resistance of the rubber molded article to an alcohol-containing fuel is insufficient, a rubber molded article obtained by molding and crosslinking a composition comprising the TFE/P/VdF ternary elastomer (fluoroelastomer (B)) and the fluoroelastomer (A) shows less swelling when immersed in an alcohol-containing fuel and thus is excellent in fuel barrier properties. The reason is not clearly understood, but this is an unexpected surprising effect contrary to the prediction.

The fluoroelastomer (B) has a lower fluorine content than the fluoroelastomer (A) and can be produced inexpensively as compared with the fluoroelastomer (A).

Therefore, according to the present invention, by using the fluoroelastomer (A) and the fluoroelastomer (B) as mixed, it is possible to obtain a fluororubber molded article which is more inexpensive than a conventional rubber molded article comprising FFKM and which is excellent in fuel barrier properties against an alcohol-containing fuel.

EXAMPLES

Now, the present invention will be described in detail with reference to Examples and Comparative Examples, but the present invention is not limited to these Examples.

As measuring methods, the following methods were used.

[Measurement of Crosslinking Sites]

With respect to the content of crosslinking sites, the fluoroelastomer (A) was measured by an X-ray fluorescence elemental analysis, and the fluoroelastomer (B) and the after-mentioned fluoroelastomer (C1) were measured by an infrared absorption spectrometry.

[Copolymer Composition]

For the composition of units (the copolymer composition) in the fluoroelastomer (A) or the fluoroelastomer (B), the fluoroelastomer (A) or the fluoroelastomer (B) was dissolved in deuterated tetrahydrofuran, and $^{13}$C-NMR was measured to analyze the copolymer composition.

[Mooney Viscosity]

A viscosity measured in accordance with JIS K6300 (established 2001) by using a L-type rotor having a diameter of 38.1 mm and a thickness of 5.54 mm, at 121° C. by setting the preheating time to be 1 minute and the rotor rotation time to be 4 minutes, was taken as a measured value of the Mooney viscosity ($ML_{1+4}$, 121° C.). This value being large indirectly indicates that the molecular weight is high.

[Rubber Physical Properties]

Hardness (Shore-A): Measured in accordance with JIS K6253 (2012) by a durometer type A hardness test at 23° C.

Specific gravity: Measured by a method in accordance with JIS K6268 (method A).

Tensile strength (unit: MPa): Measured at 23° C. in accordance with JIS K6251 (2010).

100% modulus (unit: MPa): Measured at 23° C. in accordance with JIS 6251 (2010).

Elongation at break (unit:%): Measured at 23° C. in accordance with JIS K6251 (2010).

[Fuel Barrier Properties]

A sheet-form fluororubber molded article having a thickness of 0.8 mm was used as a test specimen. The fuel permeability coefficient at room temperature (23° C.) was measured by the cup method based on JIS Z0208 (established 1976).

Specifically, the fuel permeability coefficient (unit: gram millimeters/square meter for 24 hours, hereinafter referred to as g·mm/m$^2$·24 hr) to a mixed fuel of isooctane:toluene:ethanol in a mixing ratio (mass ratio) of 45:45:10 (hereinafter referred to as CE10), and the fuel permeability coefficient (g·mm/m$^2$·24 hr) to a mixed fuel of isooctane:toluene:methanol in a mixing ratio (mass ratio) of 42.5:42.5:15 (hereinafter referred to CM15), were measured. The lower the fuel permeability coefficient, the better the fuel barrier properties.

[Measurement of Surface Appearance of Molded Article]

A section was sampled from the test specimen, and its transmission electron photograph was taken by using a transmission electron microscope ("JEM-2000X", manufactured by JEOL Ltd.). TEM photographs of the sheets prepared in Ex. 1 and Ex. 2 are shown in FIGS. 1 and 2, respectively.

Synthesis Example 1

Synthesis of Fluoroelastomer (A1)

Fluoroelastomer (A1) comprising TFE units/perfluoro (methyl vinyl ether) (hereinafter referred to as PMVE) units, was prepared as follows.

After deaerating a stainless steel pressure resistant reactor having an inner volume of 20 L equipped with an anchor blade, 8,800 g of ion-exchanged water, 220 g of F(CF$_2$)$_2$OCF$_2$CF$_2$OCF$_2$COONH$_4$ and 0.64 g of disodium hydrogen phosphate dodecahydrate, were charged, and the gas phase was replaced with nitrogen. While stirring at a speed of 375 rpm by using the anchor blade, the internal temperature was raised to 80° C. After the internal temperature reached 80° C., a monomer mixture gas (1) of TFE/PMVE=25/75 (molar ratio) was injected until the internal pressure of the reactor became 0.8 MPaG. 25 mL of an aqueous solution containing 2.5 mass % of ammonium persulfate as an initiator was added to start polymerization.

With the progress of polymerization at 80° C., the internal pressure of the reactor was lowered, and at the time when it was lowered to 0.79 MPaG, TFE gas was injected to raise the internal pressure of the reactor to 0.81 MPaG. This operation was repeated, and the polymerization reaction was continued by maintaining the internal pressure of the reactor within a range of from 0.79 to 0.81 MPaG. When the amount of TFE gas added reached 30 g, 8 g of I—(CF$_2$)$_4$—I was added by nitrogen backpressure.

Further, every time when 80 g of TFE gas was added, 50 mL of PMVE prepared in a separate stainless steel pressure resistant reactor, was injected to the reactor by nitrogen back pressure. Injection of PMVE was continued until the total amount of TFE gas added after the addition of the aqueous ammonium persulfate solution became 1,120 g.

When the total amount of TFE gas added after the addition of the aqueous ammonium persulfate solution became 1,200 g, the addition of TFE gas was stopped, and the internal temperature of the reactor was cooled to 10° C. to stop the polymerization reaction. By this operation, 9,940 g of a latex (1) of the fluoroelastomer (A1) was obtained.

The latex (1) was added to a 5 mass % aqueous solution of potassium aluminum sulfate to flocculate and precipitate the fluoroelastomer (A1). The precipitated fluoroelastomer (A1) was separated, washed with ultrapure water and dried in a vacuum oven at 50° C. for 12 hours to obtain 1,034 g of a white fluoroelastomer (A1). The fluoroelastomer (A1) contained iodine atoms as crosslinking sites.

The characteristics of the fluoroelastomer (A1) were as follows.

Copolymer composition: TFE units/PMVE units=69/31 (mol %),
Iodine content: 0.18%,
Mooney viscosity (ML$_{1+4}$, 121° C.): 78,
Specific gravity: 2.2,
Tensile strength: 19 MPa,
Elongation at break: 180%,
Hardness (Shore-A): 74,
Tg: 2° C.

Synthesis Example 2

Synthesis of Fluoroelastomer (B1)

Fluoroelastomer (B1) comprising TFE units/P unitsNdF units, was prepared as follows.

After deaerating a stainless steel pressure resistant reactor having an inner volume of 3,200 mL equipped with an anchor blade, 1,700 g of ion-exchanged water, 58 g of disodium hydrogenphosphate dodecahydrate, 1.0 g of sodium hydroxide, 9 g of sodium lauryl sulfate and 4.4 g of ammonium persulfate were added. Further, an aqueous solution prepared by dissolving 0.4 g of ethylenediamine tetraacetate disodium salt dehydrate (EDTA) and 0.7 g of ferrous sulfate heptahydrate in 200 g of ion-exchanged water, was added to the reactor. The pH of the liquid in the reactor at this time was 9.5.

Then, in such a state that the internal temperature in the reactor was 25° C., a monomer mixed gas (2) of TFE/P/VdF=25/6/69 (molar ratio) was injected so that the internal pressure of the reactor became 2.50 MPaG The anchor blade was rotated at 300 rpm, and a 6.9 mass % aqueous solution of sodium hydroxymethanesulfinate dihydrate adjusted to pH 10.0 with sodium hydroxide (hereinafter referred to as Rongalite aqueous solution) was added to the reactor, to initiate the polymerization reaction. Thereafter, the Rongalite aqueous solution was added continuously to the reactor using a high pressure pump.

With the progress of polymerization at 25° C., the internal pressure of the reactor was lowered, and when it was lowered to 2.49 MPaG, a monomer mixture gas (3) of TFE/P/VdF=39/35/26 (molar ratio) was injected by its own pressure, to raise the internal pressure of the reactor to 2.51 MPaG. This operation was repeated, and the polymerization reaction was continued by maintaining the internal pressure of the polymerization reactor within a range of from 2.49 to 2.51 MPaG. When the total amount of the monomer mixture gas (3) injected became 900 g, addition of the Rongalite aqueous solution was stopped, and the internal temperature of the reactor was cooled to 10° C. to stop the polymerization reaction. Thus, a latex (2) comprising a fluoroelastomer (B1) was obtained. The amount of the Rongalite aqueous solution added was 60 g.

The obtained latex (2) was heat-treated at 80° C. for 1 hour in the presence of tetrabutylammonium bromide and KOH, then washed, followed by drying, to introduce double bonds in the main chain of the fluoroelastomer (B1). The introduced double bonds were 0.17 mol % by mass, based on the sum of units constituting the obtained fluoroelastomer (B1).

The characteristics of the fluoroelastomer (B1) were as follows.

Copolymer composition: TFE units/P unitsNdF units=39/35/26 (mol %),
Molar ratio of [the sum of TFE units and P units]/VdF units=74/26,
Molar ratio of TFE units/P units=52.7/47.3.

Ex. 1

The fluoroelastomer (A1) obtained in Synthesis Example 1, the fluoroelastomer (B1) obtained in Synthesis Example 2, a crosslinking aid, an organic peroxide, a filler, and a processing aid were kneaded by twin rolls in a blend as shown in Table 1 to obtain a composition (X1).

The additives, etc. shown in Table 1 are as follows.
Filler (1): carbon black. MT-carbon (trade name), manufactured by CANCARB Co., Ltd.
Crosslinking aid (1): TAIC. triallyl isocyanurate, manufactured by Nippon Kasei Chemical Co., Ltd.
Organic peroxide (1): 2,5-dimethyl-2,5-di(t-butylperoxy)-hexane. Perhexa 25B (trade name), manufactured by NOF CORPORATION, 1 minute half-life temperature: 180° C.
Processing aid (1): sodium stearate. Nonsaru SN-1 (trade name), manufactured by NOF CORPORATION.

The composition (X1) was heat-pressed at 160° C. for 20 minutes for primary crosslinking, followed by secondary crosslinking at 250° C. for 4 hours, to obtain a fluororubber molded article (1) having a thickness of 0.8 mm. The fluorine content was 68.5%.

With respect to the obtained fluororubber molded article (1), a fuel permeability test was conducted to obtain the fuel permeability coefficient to CE10 and the fuel permeability coefficient to CM15. Further, as rubber physical properties, the specific gravity, tensile strength, elongation at break, 100% modulus and hardness (Shore A) were measured. These results are shown in Table 1 (the same applies hereinafter).

Ex 2

The fluoroelastomer (A1) obtained in Synthesis Example 1, the fluoroelastomer (B1) obtained in Synthesis Example 2, a crosslinking aid, an organic peroxide, a filler and a processing aid were kneaded by twin rolls in a blend as shown in Table 1 to obtain a composition (X2).

The composition (X2) was heat-pressed at 160° C. for 20 minutes for primary crosslinking, followed by secondary crosslinking at 250° C. for 4 hours to obtain a fluororubber molded article (2) having a thickness of 0.8 mm. The fluorine content was 69.1%

Ex 3

This Ex. is a Comparative Example, wherein instead of the fluoroelastomer (B), a fluoroelastomer (C1) containing no VdF units was used. As the fluoroelastomer (C1), Aflas 150P (trade name), manufactured by Asahi Glass Company, Limited, was used. The fluoroelastomer (C1) has double bonds as crosslinking sites in an amount of 0.17 mol % based on the sum of units constituting the fluoroelastomer (C1).

The characteristics of fluoroelastomer (C1) were as follows.

Copolymer composition: TFE units/P unitsNdF units=55/45/0 (mol %),
Molar ratio of [the sum of TFE units and P units]/VdF units=100/0,
Molar ratio of TFE units/P units=55/44,
Mooney viscosity ($ML_{1+4}$, 121° C.): 58,
Specific gravity: 1.6,
Tensile strength: 15 MPa,
Elongation at break: 280%,
Hardness (Shore-A): 72,
Tg: −3° C.

The fluoroelastomer (C1), a crosslinking aid, an organic peroxide, a filler and a processing aid were kneaded by twin rolls in a blend as shown in Table 1 to obtain a composition (X3).

The composition (X3) was heat-pressed at 160° C. for 20 minutes for primary crosslinking, followed by secondary crosslinking at 250° C. for 4 hours to obtain a fluororubber molded article (3) having a thickness of 0.8 mm. The fluorine content was 68.2%.

TABLE 1

| | | Ex. 1 | Ex. 2 | Ex. 3 |
|---|---|---|---|---|
| Blend [parts by mass] | Fluoroelastomer (A1) | 65 | 70 | 70 |
| | Fluoroelastomer (B1) TFE/P/VdF | 35 | 30 | — |
| | Fluoroelastomer (C1) TFE/P | — | — | 30 |
| | Organic peroxide (1) | 1 | 1 | 1 |
| | Filler (1) | 10 | 10 | 10 |
| | Crosslinking aid (1) | 5 | 5 | 5 |
| | Processing aid (1) | 1 | 1 | 1 |
| Evaluations | Fuel permeability coefficient to CE10 [g · mm/m² · 24 hr] | 0 | 0.8 | 1.8 |
| | Fuel permeability coefficient to CE15 [g · mm/m² · 24 hr] | 2.1 | 1.6 | 3.8 |
| | Hardness (Shore A) | 68 | 68 | 71 |
| | Specific gravity | 1.86 | 1.85 | 1.82 |
| | Tensile strength [MPa] | 16.6 | 15.6 | 17.3 |
| | 100% Modulus [MPa] | 2.8 | 2.7 | 3.1 |
| | Elongation at break [%] | 255 | 268 | 294 |
| | Fluorine content [mass %] | 68.5 | 69.1 | 68.2 |

It is evident that in Ex. 1 and 2 wherein as a fluoroelastomer to be combined with the fluoroelastomer (A1), the fluoroelastomer (B1) being a ternary system of TFE/P/VdF was used, the fluororubber molded article was excellent in fuel barrier properties, as compared with Ex. 3 wherein the fluoroelastomer (C1) being a binary system of TFE/P was used. The rubber physical properties were substantially equal.

Further, from a comparison between Ex. 1 and Ex. 3, it is evident that despite the fluorine content was substantially equal, the fluororubber molded article in Ex. 1 was superior in fuel barrier properties. Thus, it was confirmed possible to obtain a fluororubber molded article which has a low fluorine content despite being excellent in fuel barrier properties, and which is inexpensive and excellent in economical efficiency.

This application is a continuation of PCT Application No. PCT/JP2015/058572, filed on Mar. 20, 2015, which is based upon and claims the benefit of priority from Japanese Patent Application No. 2014-061922 filed on Mar. 25, 2014. The contents of those applications are incorporated herein by reference in their entireties.

What is claimed is:

1. A fluororubber molded article obtained by molding and crosslinking a crosslinkable composition comprising the following fluoroelastomer (A) and the following fluoroelastomer (B), wherein the mass ratio (A)/(B) of the following fluoroelastomer (A) to the following fluoroelastomer (B) in the crosslinkable composition is from 99/1 to 30/70,
   Fluoroelastomer (A): a copolymer comprising units based on tetrafluoroethylene and units based on a perfluorovinyl ether represented by the following formula (i):

$CF_2=CF-O-R^f$     (i)

wherein $R^f$ is a $C_{1-20}$ perfluoroalkyl group or a $C_{2-20}$ perfluoroalkyl group having an etheric oxygen atom between carbon atoms,
   Fluoroelastomer (B): a copolymer comprising units based on tetrafluoroethylene, units based on propylene and units based on vinylidene fluoride.

2. The fluororubber molded article according to claim 1, wherein in the fluoroelastomer (B), the molar ratio of [the sum of units based on tetrafluoroethylene and units based on propylene]/[units based on vinylidene fluoride] is from 90/10 to 50/50, and the molar ratio of [units based on tetrafluoroethylene]/[units based on propylene] is from 40/60 to 70/30.

3. The fluororubber molded article according to claim 1, wherein the content of hydrogen atoms in the fluoroelastomer (A) is at most 0.1 mass %.

4. The fluororubber molded article according to claim 1, wherein the perfluorovinyl ether represented by the formula (i) is a perfluoroalkyl vinyl ether wherein the number of carbon atoms in $R^f$ is from 1 to 8.

5. The fluororubber molded article according to claim 1, wherein in the fluoroelastomer (A), the molar ratio of [units based on tetrafluoroethylene]/[units based on the perfluorovinyl ether] is from 30/70 to 80/20.

6. The fluororubber molded article according to claim 1, wherein the fluoroelastomer (A) has a crosslinking site.

7. The fluororubber molded article according to claim 6, wherein the cross-linking site is an iodine atom or a bromine atom.

8. The fluororubber molded article according to claim 1, wherein the mass ratio (A)/(B) in the crosslinkable composition is from 95/5 to 30/70.

9. The fluororubber molded article according to claim 1, wherein the crosslinkable composition further contains an organic peroxide.

10. The fluororubber molded article according to claim 9, wherein the content of the organic peroxide is from 0.05 to 10 parts by mass per 100 parts by mass of the total amount of the fluoroelastomer (A) and the fluoroelastomer (B).

11. The fluororubber molded article according to claim 1, wherein the crosslinkable composition further contains a crosslinking aid.

12. The fluororubber molded article according to claim 11, wherein the content of the crosslinking aid is from 0.1 to 10 parts by mass per 100 parts by mass of the total amount of the fluoroelastomer (A) and the fluoroelastomer (B).

13. The fluororubber molded article according to claim 1, wherein the fluorine content in the crosslinkable composition is from 60 to 73 mass %, based on the entire polymer mass.

14. The fluororubber molded article according to claim 1, wherein the fluororubber molded article is an automobile fuel seal member.

* * * * *